United States Patent
Ghosh et al.

(10) Patent No.: US 12,450,303 B2
(45) Date of Patent: Oct. 21, 2025

(54) INTELLIGENT GENERATION OF VISUALIZATIONS OF DATA METRICS

(71) Applicant: Oracle International Corporation, Redwood Shores, CA (US)

(72) Inventors: Arindam Ghosh, Banagalore (IN); Rajan Madhavan, Foster City, CA (US); Kanagaraj Ramachandran, Bangalore (IN); Arun Sadayam, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/505,854

(22) Filed: Nov. 9, 2023

(65) Prior Publication Data
US 2025/0156492 A1    May 15, 2025

(51) Int. Cl.
G06F 17/00 (2019.01)
G06F 16/9538 (2019.01)
G06N 20/00 (2019.01)

(52) U.S. Cl.
CPC ......... G06F 16/9538 (2019.01); G06N 20/00 (2019.01)

(58) Field of Classification Search
CPC ............................ G06F 16/9538; G06N 20/00
See application file for complete search history.

(56) References Cited

U.S. PATENT DOCUMENTS

| | | | |
|---|---|---|---|
| 11,062,378 B1 * | 7/2021 | Ross | G06Q 30/01 |
| 12,056,716 B2 * | 8/2024 | Ravi | G06F 9/451 |
| 2019/0188296 A1 * | 6/2019 | Innes | G06F 16/248 |
| 2022/0100746 A1 * | 3/2022 | Chen | G06F 18/2148 |
| 2022/0114214 A1 | 4/2022 | Reddymakireddy et al. | |
| 2022/0245484 A1 * | 8/2022 | Briscoe | G06Q 30/0611 |

FOREIGN PATENT DOCUMENTS

WO    2019/032791 A1    2/2019

OTHER PUBLICATIONS

Amos Azaria and Jason Hong. 2016. Recommender Systems with Personality. In Proceedings of the 10th ACM Conference on Recommender Systems (RecSys '16). Association for Computing Machinery, New York, NY, USA, 207-210. <https://doi.org/10.1145/2959100.2959138>, Sep. (Year: 2016).*

(Continued)

*Primary Examiner* — Greta L Robinson
(74) *Attorney, Agent, or Firm* — Invoke

(57) ABSTRACT

Techniques for generating a dashboard are disclosed. The system may obtain a set of one or more characteristics of a target user. A set of candidate data metrics that are relevant to the target user may be determined by applying a metric selection model to the set of characteristics. The set of candidate data metrics may be presented as a set of recommend data metrics. Input may be received from a user selecting a particular data metric from the set of recommended data metrics. A visualization selection model may be applied to the particular data metric and/or the set of user characteristics to select a visualization type for the particular data metric. A visualization of the particular data metric that accords to the selected visualization type may be generated based on a set of values associated with the particular data set. The visualization may be presented in the user dashboard.

19 Claims, 5 Drawing Sheets

(56) References Cited

OTHER PUBLICATIONS

"Cisco Meraki Dashboard API", Retrieved from https://documentation.meraki.com/General_Administration/Other_Topics/Cisco_Meraki_Dashboard_API, May 31, 2023, pp. 3.
"Create and manage custom dashboards", Retrieved from https://cloud.google.com/monitoring/charts/dashboards, Jun. 5, 2023, pp. 5.
"Create and manage dashboards by API", Retrieved from https://cloud.google.com/monitoring/dashboards/api-dashboard, Jun. 5, 2023, pp. 9.
"Create dynamic format strings for measures", Retrieved from https://learn.microsoft.com/en-us/power-bi/create-reports/desktop-dynamic-format-strings, Apr. 19, 2023, pp. 2.
"Create measures for data analysis in Power BI Desktop", Retrieved from https://learn.microsoft.com/en-us/power-bi/transform-model/desktop-measures, Apr. 19, 2023, pp. 3.
"Custom Metrics", Retrieved from https://www.qualtrics.com/support/vocalize/dashboard-settings-cx/custom-metrics/, Jun. 8, 2023, pp. 7.
"Customize Metrics Dashboard Layout and Functionality", Retrieved from https://www.mathworks.com/help/slcheck/ug/customize-dashboard-layout-functionality.html, Jun. 8, 2023, pp. 6.
"Graph metrics manually on a CloudWatch dashboard", Retrieved from https://docs.aws.amazon.com/AmazonCloudWatch/latest/monitoring/add_old_metrics_to_graph.html, Jun. 8, 2023, p. 1.
"Managing Live Dynamic Connections", Retrieved from https://docs.sisense.com/main/SisenseLinux/managing-live-dynamic-connections.htm, Jun. 8, 2023, pp. 5.
"Select metrics for charts on dashboards", Retrieved from https://cloud.google.com/monitoring/charts/selecting-aggregating-metrics, Jun. 5, 2023, pp. 9.
"Using Amazon CloudWatch dashboards", Retrieved from https://docs.aws.amazon.com/AmazonCloudWatch/latest/monitoring/CloudWatch_Dashboards.html, Jun. 8, 2023, p. 1.

\* cited by examiner

INTELLIGENT GENERATION OF VISUALIZATIONS OF DATA METRICS

TECHNICAL FIELD

The present disclosure relates to visualizations of data metrics. In particular, the present disclosure relates to the intelligent generation of visualizations of data metrics in a dashboard.

BACKGROUND

Data metrics may be visualized in a dashboard. A dashboard may display one or more visualizations. A visualization displayed in a dashboard may depict one or more data metrics. Visualizations in a dashboard may accord to a variety of visualization types. A data metric may be generated using data metric values that originate from one or more data sets that are relevant to a user of a dashboard.

A dashboard may visualize various out-of-the-box data metrics. The out-of-the-box data metrics may be visualized in the dashboard according to standard visualization types. However, an out-of-the-box data metric that is visualized according to a standard visualization type may not be best suited for every data set. Moreover, even if a standard visualization of an out-of-the-box data metric is well suited to a data set, it may not be well suited to every user. For example, a data metric that is relevant to a marketing executive may not be relevant to a network administrator. Furthermore, different visualization types may be better suited to different users. For example, the visualization type that yields the most helpful visualization for a chief financial officer may be different than the visualization type that yields the most helpful visualization for an entry-level accountant.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
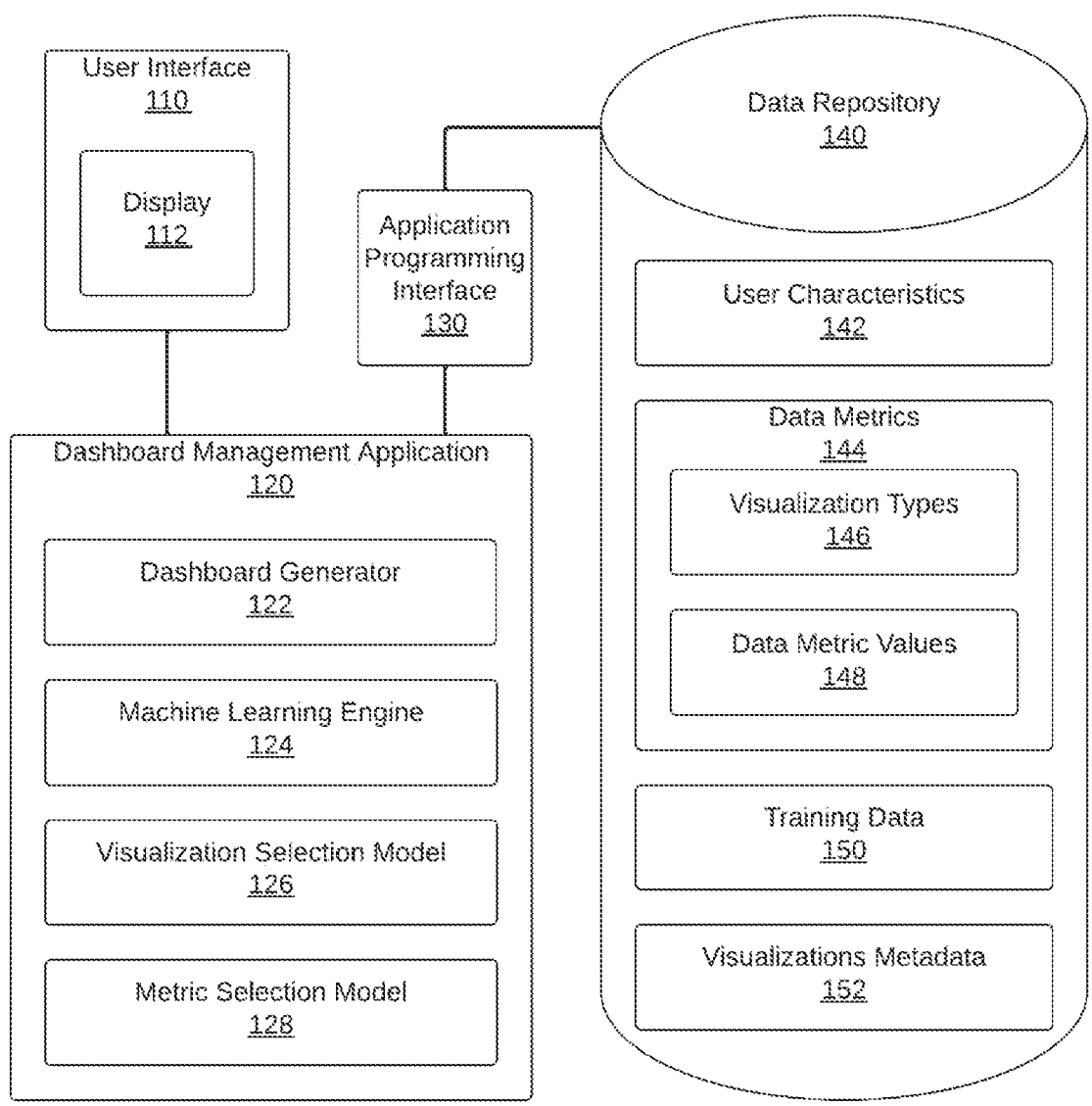
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

The following table of contents is provided for the reader's convenience and is not intended to define the limits of the disclosure.

1. GENERAL OVERVIEW
2. SYSTEM ARCHITECTURE
3. DETERMINING RELEVANT DATA METRICS FOR VISUALIZATION IN A DASHBOARD
4. SELECTING VISUALIZATION TYPES FOR VISUALIZATIONS IN A DASHBOARD
5. GENERATING A DASHBOARD
6. COMPUTER NETWORKS AND CLOUD NETWORKS
7. MICROSERVICE APPLICATIONS
   7.1 TRIGGERS
   7.2 ACTIONS
8. HARDWARE OVERVIEW
9. MISCELLANEOUS; EXTENSIONS

1. General Overview

One or more embodiments apply trained machine learning model(s) to a set of characteristics of a target user to generate a user dashboard. The dashboard, generated using the machine learning model(s), displays visualizations of data metrics that are relevant to the target user.

A metric selection model may be trained to determine data metrics relevant to a target user. The metric selection model may determine data metrics that are relevant to a target user based on the characteristics of a target user and/or other inputs. A visualization selection model may be trained to select visualization types for visualizations of the data metrics. The visualization selection model may select visualization types for a visualization based on the characteristics of a target user, the particular data metric that is to be visualized, and/or other inputs.

User characteristics and other inputs to a machine learning model, such as the metric selection model of the visualization selection model, may include but are not limited to a persona role, goals for visualization, target user activity, and target user interaction with information that may correspond to data metrics. Content presented or generated by a user may be analyzed to derive user characteristics. In an example, input from a user received by a user interface may be analyzed using natural language processing to derive one or more user characteristics.

Data metrics determined to be relevant to a target user may be presented as a set of recommended data metrics to be visualized in a dashboard. A user may interact with a user interface to select recommended data metrics, create new custom data metrics, modify existing data metrics, and to affect many other actions. User interactions may be utilized as a source for obtaining feedback regarding the determined data metrics and selected visualization types. The system may utilize the feedback to further train the machine learning model(s).

To enable the implementation of dynamically customizable visualizations of data metrics in a dashboard, data sets relevant to the user may need to be mapped to the visualizations of the data metrics. To this end, an additional representation(s) of the relevant data sets may be created. A dashboard management application may utilize the additional representation(s) to frame a query for any values that will be needed to generate a customized data metric. For example, a user may select an attribute to be added to a particular visualization of a data metric in a dashboard. If updating the visualization to include the additional attribute requires additional values, a dashboard management application may utilize an additional representation of the corresponding data set to frame a query for the additional values. In this example, the additional representation may be a multi-dimensional representation of the data set, and the query may be facilitated by an application programming interface. Upon receiving the additional values from the application programming interface, the dashboard application may update the particular visualization to reflect the additional attribute. In this way, visualizations in a dashboard may be updated dynamically to reflect customization of visualizations.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 may include user interface 110, dashboard management application 120, application programming interface (API) 130, data repository 140, components thereof, and/or other components. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, system 100 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

Additional embodiments and/or examples relating to computer networks are described below in Section 6, titled "Computer Networks and Cloud Networks."

In one or more embodiments, user interface 110 may refer to software and/or hardware configured to facilitate communications. User interface 110 renders user interface elements and receives input via user interface elements. Examples of user interfaces include a graphical user interface (GUI), a command line interface (CLI), a haptic interface, and a voice command interface. Examples of user interface elements include checkboxes, radio buttons, drop-down lists, list boxes, buttons, toggles, text fields, date and time selectors, command lines, sliders, pages, and forms.

In an embodiment, different components of user interface 110 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, user interface 110 is specified in one or more other languages, such as Java, C, or C++.

In an embodiment, user interface 110 may be associated with one or more components for presenting information to a user such as display 112. Display 112 may be implemented on a digital device or otherwise. Display 112 may be, for example, a visual device, an audio device, an audiovisual device, etc. Examples of visual devices include monitors, televisions, projectors, and many others. In an example, display 112 may be utilized to present a dashboard to a user of system 100. A user of system 100 may be a target user. A dashboard presented by display 112 may include one or more visualizations. If a dashboard displays multiple visualizations, the visualizations may accord to multiple visualization types. A visualization may depict one or more data metrics. A data metric may represent data metric values obtained from data sets that are relevant to a user of system 100. A visualization included in a dashboard presented by display 112 may include charts, graphs, data tables, maps, filters and controls, gauges, text, alerts, notifications, images, and/or other elements. The visualizations presented by display 112 may be updated dynamically. For example, the visualizations may be updated in order to reflect changes in data metric values, inputs received from a user, and/or other occurrences. Dynamic updates may occur periodically, continuously, automatically, reactively, and/or randomly.

In an embodiment, user interface 110 may be configured to facilitate interactions between the system 100 and dashboards presented by display 112. For example, a user of system 100 may utilize interface 110 to select data metrics, select visualization types, select attributes, select data sets and/or data metric values, indicate user characteristics, provide feedback, and for other interactions. Any interaction between a user of the system 100 with user interface 110 may be utilized to receive, derive, and/or otherwise obtain user characteristics.

In an embodiment, dashboard management application 120 may manage one or more dashboards. As illustrated in FIG. 1, dashboard management application 120 may include dashboard generator 122, machine learning engine 124, visualization selection model 126, metric selection model 128, components thereof, and/or other components.

In an embodiment dashboard generator 122 may generate a dashboard that is to be presented to a user of system 100. A dashboard created by dashboard generator 122 may include one or more visualizations of one or more data metrics. A dashboard created by dashboard generator 122 may visualize out-of-the-box data metrics, custom data metrics, and/or other types of data metric. A dashboard generated by dashboard generator 122 may visualized pre-existing data metrics. Additionally, or alternatively, new custom data metrics created by system 100 and/or a user of system 100 may be visualized in a dashboard generated by dashboard generator 122.

In an embodiment, system 100 may include machine learning engine 124. Machine learning includes various techniques in the field of artificial intelligence that deal with computer-implemented user-independent processes for solving problems that have variable inputs. Machine learning engine 124 may represent multiple machine learning engines. System 100 may use multiple machine learning engines and/or multiple machine learning models for different purposes.

In an embodiment, machine learning engine 124 may train machine learning models to perform one or more operations. Machine learning engine 124 may utilize machine learning algorithms to train machine learning models. A machine learning algorithm is an algorithm that can be iterated to learn a target model that best maps a set of input variables to an output variable. Training a machine learning model uses training data to generate a function that, given one or more inputs to the machine learning model, computes a corresponding output. The output may correspond to a prediction based on prior machine learning. In some embodiments, the output includes a label, classification, and/or categorization assigned to the provided input(s). A machine learning model may correspond to a learned model for performing the desired operation(s) (e.g., labeling, classifying, and/or categorizing inputs).

In an embodiment, machine learning engine 124 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 124 receives positive and/or negative reinforcement in the process of attempting to solve a particular problem (e.g., to optimize performance in a particular scenario, according to one or more predefined performance criteria). In some embodiments, the machine learning engine 124 initially uses supervised learning to train the machine learning model and then uses unsupervised learning to update the machine learning model on an ongoing basis.

In an embodiment, a machine learning engine 124 may use many different techniques to label, classify, and/or categorize inputs. Machine learning engine 124 may transform inputs into feature vectors that describe one or more properties ("features") of the inputs. Machine learning engine 124 may label, classify, and/or categorize the inputs based on the feature vectors. Additionally, or alternatively, machine learning engine 124 may use clustering (also referred to as cluster analysis) to identify commonalities in the inputs. The machine learning engine 124 may group (i.e., cluster) the inputs based on those commonalities. The machine learning engine 124 may use hierarchical clustering, k-means clustering, and/or another clustering method or combination thereof. In some embodiments, a machine learning engine 124 includes an artificial neural network. An artificial neural network includes multiple nodes (also referred to as artificial neurons) and edges between nodes. Edges may be associated with corresponding weights that represent the strengths of connections between nodes, which the machine learning engine 124 adjusts as machine learning proceeds. Additionally, or alternatively, a machine learning engine 124 may include a support vector machine. A support vector machine represents inputs as vectors. The machine learning engine 124 may label, classify, and/or categorizes inputs based on the vectors. Additionally, or alternatively, the machine learning engine 124 may use a naive Bayes classifier to label, classify, and/or categorize inputs. Additionally, or alternatively, given a particular input, a machine learning model may apply a decision tree to predict an output for the given input. Additionally, or alternatively, a machine learning engine 124 may apply fuzzy logic in situations where labeling, classifying, and/or categorizing an input among a fixed set of mutually exclusive options is impossible or impractical. The aforementioned machine learning models and techniques are discussed for purposes of example only and should not be construed as limiting some embodiments.

In an embodiment, as machine learning engine 124 applies different inputs to a machine learning model, the corresponding outputs are not always accurate. As an example, the machine learning engine 124 may use supervised learning to train a machine learning model. After training the machine learning model, if a subsequent input is identical to an input that was included in labeled training data and the output is identical to the supervisory signal in the training data, then output is certain to be accurate. If an input is different from inputs that were included in labeled training data, then the machine learning engine 124 may generate a corresponding output that is inaccurate or of uncertain accuracy. In addition to producing a particular output for a given input, the machine learning engine 124 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In an embodiment, machine learning engine 124 may train visualization selection model 126 to select visualization types for visualizations. Visualization selection model 126 may be trained using sets of training data. An example set of training data that may be used to train visualization selection model 126 may include one or more characteristics of a particular user, one or more data metrics, one or more visualization types, and/or other training data. Examples of user characteristics that may be included in a set of training data include user activity, user interactions with information corresponding to data metrics, goal(s) for visualization, persona role(s), and/or other characteristics.

In an embodiment, an application of visualization selection model 126 may return one or more visualization types for one or more visualizations. Visualization selection model 126 may be applied to select a visualization type for visualizations of out-of-the-box data metrics, custom data metrics, and/or other data metrics. Visualization selection model 126 may select a visualization type for a visualization of a data metric that was determined to be relevant to a target user by metric selection model 128. Additionally or alternatively, visualization selection model 126 may be utilized to select a visualization type for a visualization of a data metric that was not determined to be relevant by metric selection model 128. Visualization selection model 126 may be utilized to select visualization types for visualizations of one or more data metrics of a set of candidate data metrics. One or more visualization types selected by visualization selection model 126 may be presented as a set of recommended visualization types for a visualization. In an example, visualization selection model 126 may select a visualization type based on one or more user characteristics, a particular data metric, and/or other inputs. For instance, visualization selection model 126 may select a visualization type for a data metric based on the particular data metric and/or a persona role of a target user. System 100 may receive feedback regarding selected visualization types. The feedback may be utilized to further train visualization selection model 126.

In an embodiment, machine learning engine 124 may train metric selection model 128 to determine data metrics that are relevant to a target user. Metric selection model 128 may be trained using sets of training data. An example set of training data that may be used to train metric selection model 128 may include one or more characteristics of a particular user, one or more data metrics, and/or other data. Examples of user characteristics that may be included in a set of training data include user activity, user interactions with information corresponding to data metrics, goal(s) for visualization, persona role(s), and/or other user characteristics.

In an embodiment, an application of metric selection model 128 may return one or more data metrics that are determined to be relevant to a target user. An application of metric selection model 128 may return out-of-the-box data metrics, custom data metrics, and/or other data metrics. An application of metric selection model 128 may return pre-existing data metrics and/or newly created data metrics. One or more data metrics determined to be relevant by metric selection model 128 may be included in a set of candidate data metrics. In an example, metric selection model 128 may determine a data metric to be relevant based on a set of characteristics of a target user and/or other inputs. For instance, metric selection model 128 may determine that a data metric is relevant based on a persona role of a target user. System 100 may obtain feedback regarding determinations made by metric selection model 128. The feedback may be utilized to further train metric selection model 128.

In an embodiment, API 130 may facilitate the transfer of information between nodes. For example, dashboard management application 120 may be configured to retrieve data from a data repository by "pulling" the data via API 130 using credentials for accessing the data source. The credentials may be, for example, an access key, password, and/or any other kind of credentials that may be used to access a data source. The credentials may be provided from a user of system 100 or elsewhere. Additionally or alternatively, a data source may be configured to "push" information to dashboard management application 120. A data source may push information through API 130 to dashboard management application 120 using credentials supplied from the data source, a user of system 100, or elsewhere. API 130 may be called to query for data. In an example, queries may be event-based and/or order-based. Interactions with user interface 110 may result in one or more calls to API 130. For example, a user may interact with an interface to indicate an attribute to be added to a visualization of a data metric. Generating the visualization of the data metric with the additional attribute may require additional values. As such, API 130 may be called to query for the additional values. In this example, the query may be parameterized based on the user interactions with the user interface. API 130 may represent one or more APIs. API 130 may be a microservice API. Additional embodiments and/or examples relating to microservices are described below in Section 7, titled "Microservice Applications."

In one or more embodiments, a data repository 140 is any type of storage unit and/or device (e.g., a file system, database, collection of tables, or any other storage mechanism) for storing data. Data repository 140 may include multiple different storage units and/or devices. The multiple different storage units and/or devices may or may not be of the same type or located at the same physical site. Data repository 140 may be implemented or executed on the same computing system as one or more components of system 100. Additionally, or alternatively, data repository 140 may be implemented or executed on a computing system separate from one or more of the components of system 100. Data repository may be communicatively coupled to components of the system 100 and/or other nodes via a direct connection or via a network.

As illustrated in FIG. 1, data repository 140 may store user characteristics 142, data metrics 144, data metric types 146, data metric values 148, training data 150, visualizations metadata 152, and/or other data. Information describing user characteristics 142, data metrics 144, data metric types 146, data metric values 148, training data 150, visualizations metadata 152, and/or other data may be implemented across any of the components within or exterior to the system 100. Furthermore, information describing user characteristics 142, data metrics 144, data metric types 146, data metric values 148, training data 150, visualizations metadata 152, and/or other data may be spread across multiple devices. However, this information is illustrated within the data repository 140 for purposes of clarity and explanation.

In an embodiment, data repository 140 may store user characteristics 142 of one or more users. User characteristics 142 may include a set of characteristics of a target user. User characteristics 142 stored by data repository 140 may originate from a component of system 100, a user of system 100, a data source external to the system 100, and/or other data sources. User characteristics 142 may include any data that may be of relevance to optimizing a dashboard for a target user. User characteristics 142 may include behavioral and transactional characteristics, demographic characteristics, device and technology characteristics, and other characteristics. It should be noted that user characteristics 142 may be indirectly associated with a user. For example, user characteristics 142 may include seasonality factors, customer characteristics, economic indicators, weather data, public social media activity, sensor data, and/or various other data. Examples of user characteristics 142 include user activity, user interactions with information corresponding to data metrics, goal(s) for visualization, persona role(s), and other characteristics.

In an embodiment, user characteristics 142 may include user activity and/or user interactions with information that may relate to a data metric. User activity and interactions may be captured by a component of system 100. For example, user activity and interactions may include input received by user interface 110. User characteristics 142 may also include user activity and user interactions that were captured by a component external to system 100. For example, user characteristics 142 may include user activity and interactions involving digital devices and/or computer networks that are external to system 100. Examples of user activity and user interactions that may be included in user characteristics 142 include user interactions with data sets, content that is generated by a user, content that is presented by a user, input indicating a selection of a data metric and/or visualization type, input indicating a goal for visualization, input indicating attributes to be included in a data metric, input indicating a persona role, input indicating settings and preferences, and many other inputs, interactions, and activities.

In an embodiment, user characteristics 142 of a target user may include one or more persona roles. A persona role may reflect a user's vocational role, vocational setting (e.g. an industry), vocational responsibilities, skill set, educational/ vocational history, supervisors, supervisees, etc. Examples of a persona role may include system administrator, chief financial officer, project manager, data analyst, marketing executive, analytics user, and many others. A user of system 100 may be organized into groups and/or hierarchies with other individuals based on the user's persona role. A persona role may reflect a user's membership in a tenant. A tenant is a corporation, organization, enterprise or other entity that accesses a shared computing resource. In an example, the persona role of a user may reflect the user's position within the tenant. Information reflected in a user's persona role may also be reflected in other user characteristics 142. For instance, a persona role may reflect the industry of a user and/or the industry of a user may be reflected in other user characteristics 142.

In an embodiment, one or more user characteristics 142 may be derived based on other user characteristics 142 and/or other data. For example, content that is presented by or generated by a user may be analyzed to derive other user characteristics 142. In another example, natural language processing may be utilized to analyze user characteristics 142 and/or other data to derive other user characteristics 142. For instance, system 100 may receive user input indicating a goal for visualization. Natural language processing may be utilized to analyze the user input and extract the goal for visualization. In yet another example, one or more machine learning models may be trained to derive user characteristics 142. For instance, one or more machine learning models may be trained to derive a persona role based on user activity. The one or more machine learning models may be trained by machine learning engine 124.

In an embodiment, data repository 140 may store data metrics 144. Data metrics 144 may be visualized according to visualization types 146. A visualization of a data metric 144 may accord to a variety of visualization types 146. Data metrics 144 may be generated with data metric values 148. Data metrics 144 may include out-of-the-box data metrics, custom data metrics, and/or other data metrics. General examples of data metrics 144 include sales metrics, financial metrics, marketing metrics, system performance metrics, supply chain metrics, project management metrics, healthcare metrics, manufacturing metrics, and many others. Data metrics 144 may represent quantities, qualities, trends, patterns, anomalies, comparisons, forecasts, projections, strengths, weaknesses, etc. Data metrics 144 may represent sales campaigns, advertising campaigns, and/or any other types of campaigns. Data metrics 144 may be utilized for planning, monitoring, evaluating, and comparing past and/or present campaigns. In an example, if data metric values 148 correspond to an ongoing campaign, relevant data metrics 144 may be determined and visualization types 146 may be selected such that the resulting visualization presents a forecast trend report that may be utilized to improve the ongoing campaign. In another example, if data metric values 148 correspond to a future campaign, data metrics 144 may be determined and visualization types 146 may be selected such that the resulting visualization presents a comparison of the future campaign with historical campaigns that may be utilized to help further plan and optimize the future campaign. For instance, similar campaigns that occur over significant time periods, such as Thanksgiving and Christmas, may be compared to retarget the audience in order to achieve a better conversion rate.

In an embodiment, a data metric 144 may be created by a component of system 100, a component exterior to system 100, a user of system 100, and/or other creators. A user of system 100 may interact with user interface 110 to select, create, modify, and/or otherwise customize data metrics 144. System 100 may create a custom data metric 144 based on identifying attributes that tend to be relevant to the characteristics of a user. A data metric 144 may be generated using one or more machine learning models. For example, a data metric 144 that forecasts profit over time may be generated by applying a machine learning model (e.g. a time series, linear regression, long short-term memory, etc.) to data metric values 148. A machine learning model utilized to generate a data metric 144 may be trained by machine learning engine 124.

In an embodiment, data metrics 144 may represent data metric values 148. Data metric values 148 may originate from one or more data sets that are relevant to a user of system 100. Data metric values 148 may be included in a set of values associated with a particular data metric that are used to generate a visualization. Data metric values 148 may be mapped to data metrics 144 by creating one or more additional representations of the data sets from which the data metric values 148 originate. An API, such as API 130 and/or another API, may be utilized to retrieve data metric values 148. The quantity and quality of data metric values 148 that are to be represented in a visualization may affect the determination of the corresponding data metric 144 and the selection of the corresponding visualization type 146. For example, a small number of data metric values 148 may be represented by a different data metric 144 and visualized according to a different visualization type 146 than a large number of data metric values 148.

In an embodiment, data repository 140 may store training data 150. Training data 150 may be utilized to train visualization selection model 126, metric selection model 128, and/or other machine learning models. Training data 150 may contain one or more sets of training data. In an example, a set of training data may include user characteristics, data metrics, visualization types, and/or other data. Examples of user characteristics that may be included in a set of training data include user activity, user interactions with information corresponding to data metrics, goal(s) for visualization, persona role(s), and/or other characteristics. A set of training data may include feedback regarding outputs of machine learning models. For example, training data 150 may include feedback regarding selections made by visualization selection model 126 and/or feedback regarding determinations made by metric selection model 128. Feedback may be received, derived, and/or otherwise obtained from any interaction between a user of the system 100 with user interface 110 and/or other sources.

In an embodiment, data repository 140 may store visualizations metadata 152. Visualizations metadata 152 may include metadata of data sets relevant to a user of system 100. Visualizations metadata 152 may be utilized to help map data metric values 148 to visualizations of data metrics 144. Consider, for example, a data set that includes one or more data metric values 148. The data set is maintained in a data table of a data source. The attributes of the data table are an example of visualizations metadata 152. The attributes of the data table may be utilized to create one or more additional representations of the data set. For instance, the attributes of the data table may be promoted to a data source view (DSV). The attributes of the DSV may be promoted to a multi-dimensional representation. In this example, the data set might be represented multi-dimensionally in terms of dimensions and measures. A dimension may represent a categorical property of a data point of a data set. A measure may represent a quantitative property of a data point of a data set. If a table attribute corresponds to a dimension, that attribute may be promoted directly to DSV and to the multi-dimensional representation. If a table attribute corresponds to a measure, promotion may require one or more calculations. The multi-dimensional representation may be utilized to frame queries for data metric values 148. Queries may be parameterized based on user interactions with a user interface. For instance, a user may indicate in an input to a user interface that the total sales in a region should be represented in a visualization of a dashboard. A corresponding query may be parameterized in terms of a dimension and a measure, wherein the dimension is the region, and the measure is the total sales. The queries may be directed to an API such as, for example, API 130 and/or other APIs. In this way, data metric values 148 may be mapped to visualizations of data metrics 144. As a result, visualizations of data metrics 144 may be created and/or updated dynamically to reflect customizations directed by a user of system 100 and/or system 100.

3. Determining Relevant Data Metrics for Visualization in a Dashboard

Figure 2:
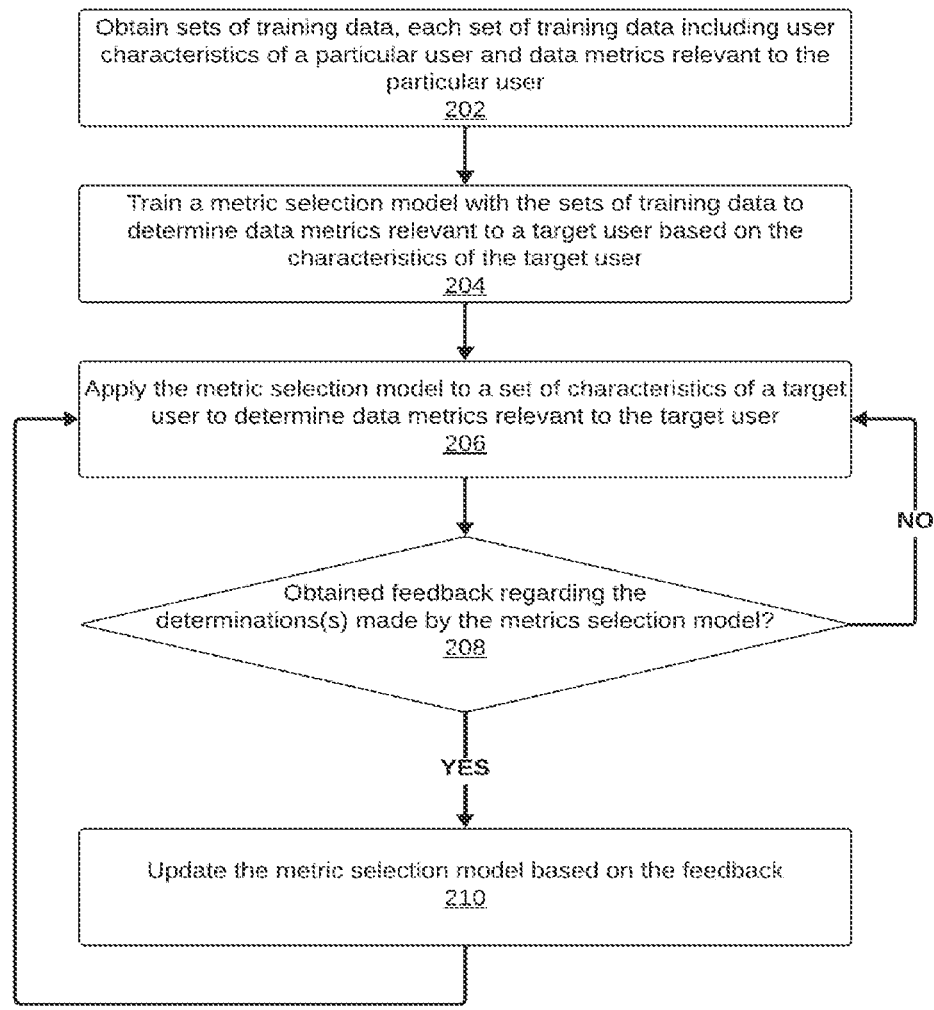
FIG. 2 illustrates an example set of operations for determining data metrics for visualization in a dashboard in accordance with one or more embodiments.

FIG. 2 illustrates an example set of operations for determining data metrics relevant to a target user. One or more operations illustrated in FIG. 2 may be modified, rearranged, or omitted all together. Accordingly, the particular sequence of operations illustrated in FIG. 2 should not be construed as limiting the scope of one or more embodiments.

In operation 202, one or more sets of training data may be obtained. Training data may be obtained from a data repository of the system, other components of the system, a data repository external to the system, a user of the system, and/or other data sources. Training data may be obtained by a dashboard management application. The obtaining of training data may be facilitated by an API. An example set of training data obtained in this operation may include one or more characteristics of a particular user, one or more data metrics, and/or other data. Examples of user characteristics that may be included in a set of training data include user activity, user interactions with information corresponding to data metrics, goal(s) for visualization, persona role(s), and/or other characteristics. A set of training data may include feedback regarding previous applications of one or more visualization selection models, metric selection models, and/or other models.

In operation 204, a metric selection model may be trained to determine one or more data metrics that are relevant to a user. One or more metric selection models and/or other models may be trained in this operation. A metric selection model trained in this operation may be trained by a machine learning engine. A metric selection model may be trained with one or more sets of training data obtained in operation 202. A metric selection model may be trained to determine data metrics based on one or more user characteristics and/or other inputs. In an example, a set of training data may include user characteristics such as a persona role and/or other user characteristics. In this example, data metrics relevant to a particular persona role may be identified. The relevance of a data metric to a particular persona role may be identified based on how often a data metric is selected by users of the particular persona role, how recently a data metric has been utilized by users of the particular persona role, how frequently visualizations of a data metric are interacted with by users of the particular persona role, and/or other criteria. Relevant data metrics may also be determined based on similarities between persona roles. For instance, if a particular data metric is relevant to a first persona role, and if the first persona role is similar to a second persona role, the particular data metric may be identified as relevant to the second persona role. Additionally, or alternatively, individual attributes that are relevant to a persona role may be identified. For instance, if a monetary-based attribute tends to appear in data metrics selected by users of a persona role, the monetary-based attribute may be identified as relevant to the persona role. Data metrics that are relevant to a persona role may be identified based on the attributes of the data metric. For instance, a data metric may be relevant to a persona role if the data metric contains attributes that have been identified as being relevant to the persona role.

Figure 4:
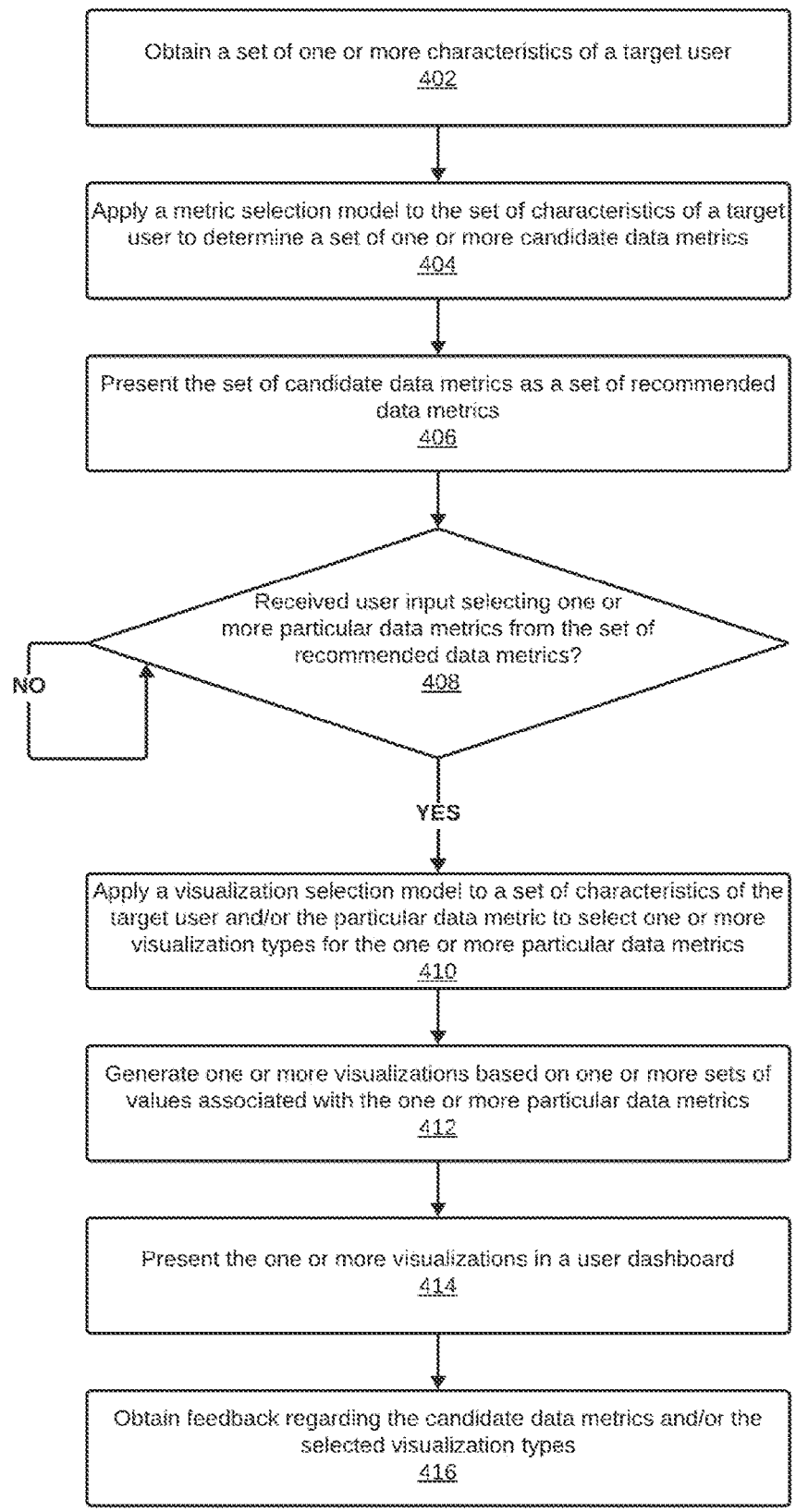
FIG. 4 illustrates an example set of operations for generating a dashboard in accordance with one or more embodiments.

In operation 206, a metric selection model may be applied to determine one or more data metrics that are relevant to a target user. One or more metric selection models may be applied in this operation. Two or more metric selection models applied in this operation may be different varieties of machine learning model. A metric selection model may determine one or more data metrics relevant to a target user based on one or more characteristics of a set of characteristics and/or other inputs. Examples of user characteristics that may be included in a set of characteristics include user activity, user interactions with information corresponding to data metrics, goal(s) for visualization, persona role(s), and/or other characteristics. Inputs to the metric selection model may be obtained from a data repository of the system, other components of the system, a data repository external to the system, a user of the system, and/or other data sources. One or more additional user characteristics of a target user may be derived in this operation. User characteristics may be derived by analyzing other user characteristics and/or other data. Derived user characteristics may be a basis for determining relevant data metrics. One or more data metrics that are determined to be relevant to the target user may be visualized in a dashboard that is presented to a user. In an example, one or more data metrics that are determined to be relevant to the target user may be included in a set of candidate data metrics. The set of candidate data metrics may be presented to a user as a set of recommended data metrics. Data metrics selected by a user from the set of recommended data metrics may be visualized in a dashboard. Additionally, or alternatively, data metrics determined to be relevant may be visualized in a dashboard without having first received user input selecting the data metrics. This operation may be similar to operation 404 as depicted in FIG. 4 because both operations determine data metrics relevant to a target user by applying a metric selection model to similar inputs.

In operation 208, the system may proceed to another operation if feedback regarding a data metric is received. For example, if the system receives feedback regarding a data metric that was determined to be relevant in operation 206 (YES in operation 208), the system may proceed to operation 210. Alternatively, if the system does not receive feedback (NO in operation 208), the system may return to operation 206. Feedback may be obtained from a user of the system, a component of the system, a component external to the system, and/or other sources of feedback. Feedback may be received, derived, and/or otherwise obtained from any interaction with a user. In an example, feedback may be obtained from user interactions with a user interface. Examples of user interactions from which feedback may be obtained include interactions selecting one or more data metrics from a set of candidate data metrics, interactions modifying data metrics (e.g. adding or removing attributes), and/or other interactions regarding a data metric. A user may provide linguistic feedback regarding one or more data metrics. In this scenario, natural language processing may be utilized to analyze the linguistic feedback and translate it into a format that may be utilized to train a machine learning model. Any obtained feedback may be stored with other training data and may be utilized to further train a metric selection model and/or other machine learning models.

In operation 210, a metric selection model may be further trained to determine data metrics that are relevant to a target user. A metric selection model trained in this operation may be trained with training data that includes feedback regarding one or more previous applications of the metric selection model and/or other models. Feedback utilized to train a metric selection model in this operation may have been feedback received in operation 208. Feedback utilized in this operation may relate to one or more data metrics that were determined to be relevant in an occurrence of operation 206. One or more metric selection models and/or other models may be trained in this operation. A metric selection model trained in this operation may be trained by a machine learning engine.

4. Selecting Visualization Types for Visualizations in a Dashboard

Figure 3:
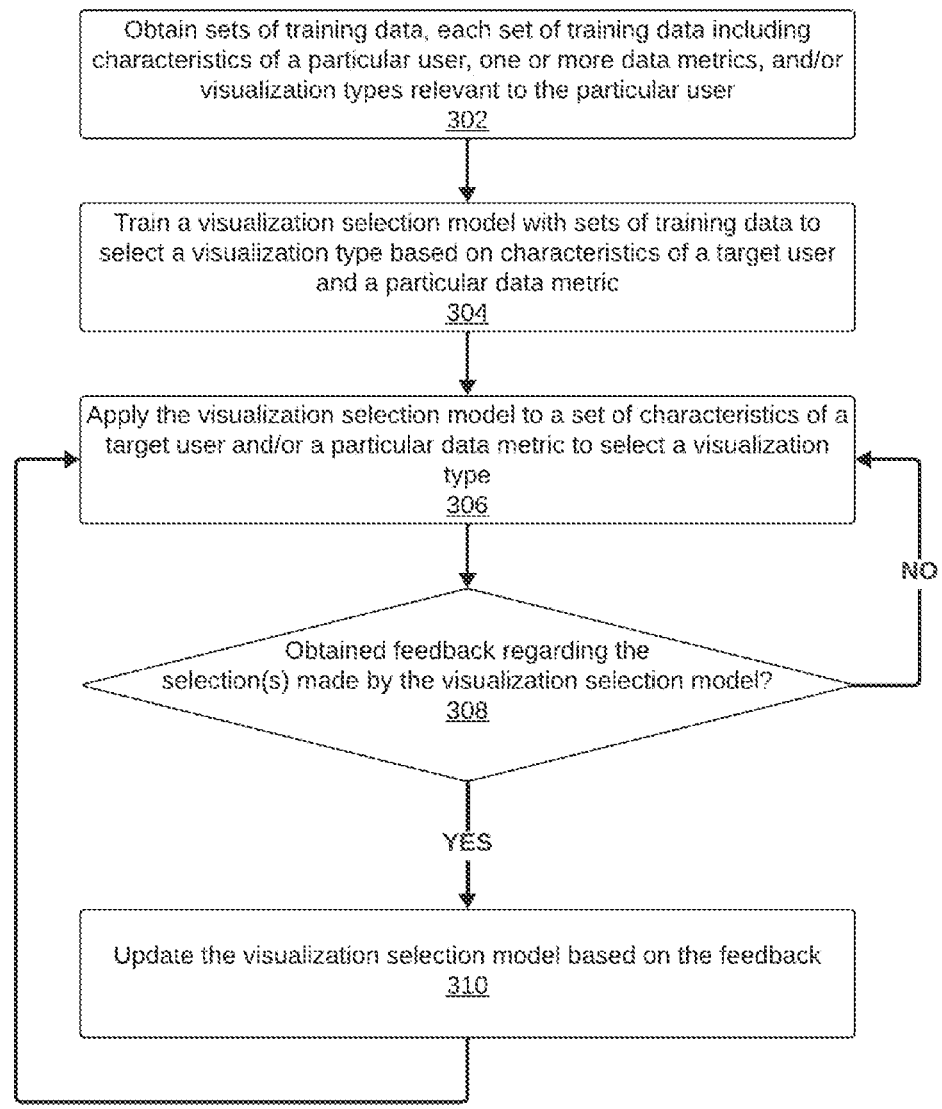
FIG. 3 illustrates an example set of operations for selecting visualization types for visualizations in a dashboard in accordance with one or more embodiments.

FIG. 3 illustrates an example set of operations for selecting a visualization type for a visualization. One or more operations illustrated in FIG. 3 may be modified, rearranged, or omitted all together. Accordingly, the particular sequence of operations illustrated in FIG. 3 should not be construed as limiting the scope of one or more embodiments.

In operation 302, one or more sets of training data may be obtained. Training data may be obtained from a data repository of the system, another component of the system, a user of the system, a data repository external to the system, and/or other data sources. Training data may be obtained by a dashboard management application. The obtaining of training data may be facilitated by an API. An example set of training data may include one or more characteristics of a particular user, one or more data metrics, one or more visualization types, and/or other data. Examples of user characteristics that may be included in a set of training data include user activity, user interactions with information corresponding to data metrics, goal(s) for visualization, persona role(s), and/or other characteristics. A set of training data may also include feedback regarding previous applications of one or more visualization selection models, metric selection models, and/or other models.

In operation 304, a visualization selection model may be trained to select one or more visualization types for one or more data metrics. One or more visualization selection models and/or other models may be trained in this operation. A visualization selection model trained in this operation may be trained by a machine learning engine. A visualization selection model may be trained with one or more sets of training data obtained in operation 302. A visualization selection model may be trained to select a visualization type based on the data metric(s) that is to be visualized, a set of one or more characteristics of a user, and/or other inputs. In an example, a visualization selection model may be trained to select a visualization type based on a persona role and/or other user characteristics. In this example, the pertinence of a visualization type to a persona role may be identified based on how often a visualization type is selected by users of the persona role, how recently a visualization type has been selected by users of the persona role, how frequently a visualization of the visualization type is interacted with by users of the persona role, and/or other criteria. Additionally, or alternatively, a visualization selection model may be trained to select a visualization type based on the data metric that is to be visualized. For example, a visualization selection model may consider how frequently a data metric is visualized according to a visualization type, how recently a data metric has been visualized according to a visualization type, the attributes of the data metric, the quantity of data metric values that will be represented by the data metric, and/or other qualities of the data metric.

In operation 306, a visualization selection model may be applied to select one or more visualization types for one or more visualizations. One or more visualization selection models may be applied in this operation. A visualization selection model may select a visualization type based on the data metric that is to be visualized, one or more characteristics of a set of characteristics, and/or other inputs. A visualization type selected for one visualization that is to be displayed in a dashboard may impact the visualization type that is selected for another visualization that is to be displayed in the dashboard. Examples of user characteristics that may be included in a set of characteristics include user activity, user interactions with information corresponding to data metrics, goal(s) for visualization, persona role(s), and/or other characteristics. One or more additional user characteristics may be derived in this operation. User characteristics may be derived by analyzing other user characteristics and/or other data. Inputs to the visualization selection model may be obtained from a data repository of the system, other components of the system, a data repository external to the system, a user of the system, and/or other data sources. A visualization selection model may be applied to select a visualization type for any visualization that may be presented in a dashboard. For example, a visualization selection model may be applied to select a visualization type for visualizations of custom data metrics, out-of-the-box data metrics, and/or other data metrics. In an example, a visualization selection model may be applied to select a visualization type for each data metric included in a set of recommended data metrics. Selected visualization types may be presented as recommended visualization types and/or selected visualization types may be applied to visualizations of data metrics without having first received user input regarding the selected visualization types. This operation may be similar to operation 410 as depicted in FIG. 4 because both operations select visualization types by applying a visualization selection model to similar inputs.

In operation 308, the system may proceed to another operation if feedback regarding a visualization type is received. For example, if the system receives feedback regarding a visualization type that was selected in operation 306 (YES in operation 308), the system may proceed to operation 310. If the system does not receive feedback (NO in operation 308), the system may return to operation 306. Feedback may be obtained from a user of the system, a component of the system, a component external to the system, and/or other sources of feedback. Feedback may be received, derived, and/or otherwise obtained from any interaction with a user. In an example, feedback may be obtained from user interactions with a user interface. Examples of user interactions from which feedback may be obtained include interactions selecting a visualization type, interactions modifying a visualization, and/or other interactions regarding a visualization. A user may provide linguistic feedback regarding one or more visualizations. In this scenario, natural language processing may be utilized to analyze the linguistic feedback and translate it into a format that may be utilized to train a machine learning model. Any obtained feedback may be stored with other training data. Any obtained feedback may be utilized to further train a metric selection model and/or other machine learning models.

In operation 310, a visualization selection model may be further trained to select a visualization type for a visualization. A visualization selection model trained in this operation may be trained with training data that includes feedback regarding one or more previous applications of the visualization selection model and/or other models. The feedback utilized to train a visualization selection model in this operation may have been obtained in operation 308. The feedback utilized in this operation may relate to one or more visualization types that were selected in operation 306. One or more visualization selection models and/or other models may be trained in this operation. A visualization selection model trained in this operation may be trained by a machine learning engine.

5. Generating a Dashboard

FIG. 4 illustrates an example set of operations for generating a dashboard. One or more operations illustrated in FIG. 4 may be modified, rearranged, or omitted all together. Accordingly, the particular sequence of operations illustrated in FIG. 4 should not be construed as limiting the scope of one or more embodiments.

In operation 402, the system may obtain a set of characteristics of a target user. A set of characteristics of a target user may contain one or more user characteristics. User characteristics may be obtained from a data repository of the system, other components of the system, a data repository external to the system, a user of the system, and/or other data sources. User characteristics may be obtained by a dashboard management application. The obtaining of user characteristics may be facilitated by an API. Examples of user characteristics that may be included in a set of characteristics include user activity, user interactions with information corresponding to data metrics, goal(s) for visualization, persona role(s), and other characteristics. Examples of user activity and user interactions include interactions with data sets relevant to the user, content that is generated by a user, content that is presented by a user, interactions indicating a selection of a data metric and/or visualization type, interactions indicating a goal for visualization, interactions indicating attributes to be included in a data metric, interactions indicating a persona role, interactions indicating settings and preferences, and many other inputs, interactions, and activities. One or more user characteristics may be derived in this operation. User characteristics may be derived by analyzing other user characteristics and/or other data. For example, content that is presented by and/or generated by a user may be analyzed to derive one or more user characteristics. In another example, natural language processing may be utilized to analyze user activity. For instance, linguistic input may be received through a user interface that indicates a goal for visualization and/or any other user characteristic. Natural language processing may be utilized to analyze the input and extract the goal for visualization. In yet another example, one or more machine learning models may be trained to derive user characteristics based on user activity, interactions, and other inputs. For instance, a machine learning model may derive a persona role. Derived user characteristics may be included in a set of characteristics.

In operation 404, a metric selection model may be applied to determine one or more data metrics that are relevant to a target user. One or more metric selection models may be applied in this operation. A metric selection model applied in this operation may have been previously trained by a machine learning engine. A metric selection model may determine one or more data metrics to be relevant to a target user based on one or more user characteristics of a set of characteristics and/or other inputs. The set of characteristics may have been obtained in operation 402. The one or more data metrics that are determined to be relevant to the target user may be included in a set of candidate data metrics. This operation may be similar to operation 206 as depicted in FIG. 2, because both operations determine data metrics relevant to a target user by applying a metric selection model to similar inputs.

In operation 406, a set of recommended data metrics may be presented. The set of recommended data metrics may be presented to a user of the system. The user of the system may be a target user. The set of recommended data metrics may include the set of candidate data metrics that were determined to be relevant to the target user in operation 404. Additionally, or alternatively, the set of candidate data metric may include data metrics that were not determined to be relevant to the target user in operation 404. For example, the set of recommended data metrics may include data metrics determined in operation 404 as well as data metrics that are included as standard suggestions. In an example, the set of recommended data metrics may be presented by a display.

In operation 408, the system may proceed to another operation if input selecting one or more data metrics is received. For example, if the system receives input indicating a selection of one or more data metrics of the set of recommended data metrics presented in operation 406 (YES in operation at 408), the system may proceed to operation at 410. Alternatively, if the system does not receive input selecting a data metric (NO in operation 408), operation 408 may repeat. In an example, input may be received through interactions with a user interface.

In operation 410, a visualization selection model may be applied to select one or more visualization types for one or more visualizations of data metrics. A visualization selection model may select a visualization type based on the data metric that is to be visualized, a set of one or more characteristics, and/or other inputs. A visualization type selected for one visualization that is to be displayed in a dashboard may impact the visualization type that is selected for another visualization that is to be displayed in the dashboard. The set of characteristics may have been obtained in operation 402. Examples of inputs relating to a data metric may include how frequently the data metric is visualized according to a visualization type, how recently the data metric has been visualized according to a visualization type, the attributes of the data metric, the quantity of data metric values that will be represented by the data metric, and/or other qualities of the data metric. In an example, a visualization selection model may be applied to one or more visualizations of one or more data metrics included in the set of recommended metrics presented in operation 406. This operation may be similar to operation 306 as depicted in FIG. 3 because both operations select visualization types by applying a visualization selection model to similar inputs.

In operation 412, the system may generate one or more visualizations of one or more data metrics. Visualizations may be generated by a dashboard generator of a dashboard management application. A visualization may represent one or more data metrics. A visualization generated in this operation may correspond to one or more data metrics selected in operation 408. The visualization type of a generated visualization may have been selected in operation 410. The visualizations of the data metrics may be generated based on a set of values associated with the particular data metric. Data metric values are an example of values that may be included in a set of values that are used to generate a visualization. Data metric values may originate from one or more data sets that are relevant to a target user of the system. Data metric values may be mapped from data sets to visualizations of data metrics by creating one or more additional representations of the data sets. The additional representations may be created using visualizations metadata. In an example, data metric values may originate in a data table of a data source. Attributes of the data table may be promoted to a DSV. Attributes of the DSV may in turn be promoted to a multi-dimensional model such as, for instance, a cube data model. The cube data model may be utilized to query for the data metric values that will be represented by the data metrics. Queries for data metric values may be facilitated by one or more APIs.

In operation 414, one or more visualizations depicting one or more data metrics may be presented in a user dashboard. Visualizations of custom data metrics, out-of-the-box data metrics, and/or other data metrics may be presented in this operation. The data metrics may be visualized according to various visualization types. One or more of the visualizations may have been generated in operation 412. Multiple visualization types of a singular data metric may be presented in the dashboard. Visualizations presented in this operation may be updated dynamically to reflect changes in data metric values, interactions with a user of the system, and/or other occurrences. In an example, the dashboard may be presented by a display of the system.

In operation 416, feedback may be obtained regarding one or more visualizations presented in operation 414. Feedback received in operation 416 may pertain to a data metric of a visualization, a visualization type of a visualization, and/or other elements of a dashboard. Feedback may be obtained from a user of the system, a component of the system, a source exterior to the system, and/or other sources of feedback. The system may receive, derive, and/or otherwise obtain feedback from any interaction with a user. Input received in operation 408 may be a source of feedback. Other examples of user interactions with a user interface from which feedback may be obtained include user interactions with a visualization of a data metric, user interactions indicating an alteration to be made to a data metric, and/or other interactions. Any feedback obtained may be utilized to further train one or more machine learning models such as a metric selection model and/or a visualization selection model. Further, the visualization presented in operation 414 may be updated dynamically to reflect any feedback obtained. In an example, user input indicating an attribute to be added to a data metric may be received through a user interface. If additional data metric values are needed to generate the visualization of the data metric with the additional attribute, one or more new queries may be spawned to provide the additional data metric values. In this example, a dashboard management application may utilize a multi-dimensional representation of the corresponding data set to frame a query for the additional data metric values. The query may be parameterized based on the user inputs. The query may be directed to an API. Upon receiving the additional data metric values from the API, the data metric may be updated and a visualization selection model may be applied to the updated data metric. The visualization presented in the dashboard may then be updated to reflect changes to the data metric and/or visualization type. In this example, the user input may also be utilized as feedback to further train the metric selection model, a visualization selection model, and/or other machine learning models.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may additionally or alternatively provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

7.1 Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

7.2 Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
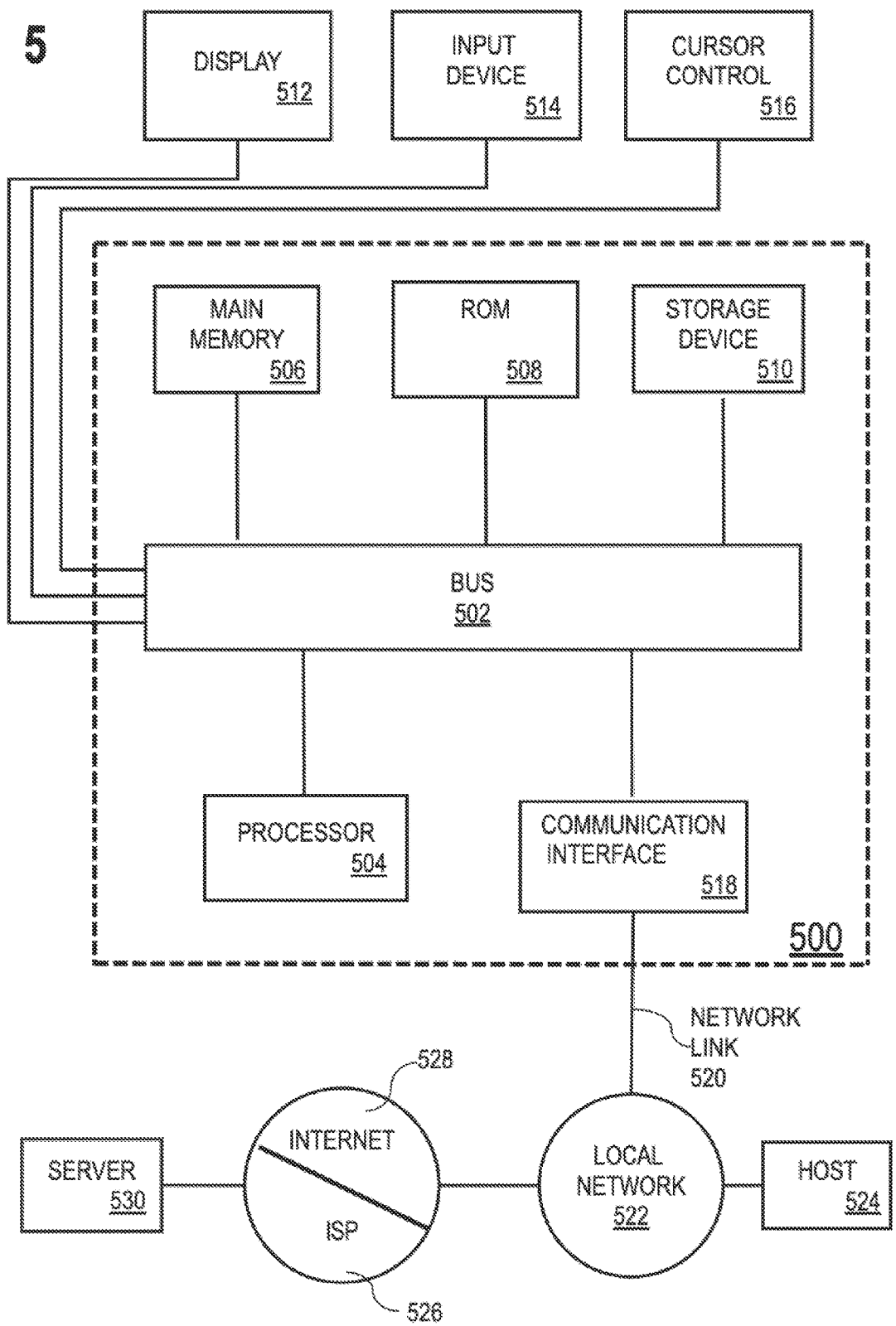
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9. Miscellaneous; Extensions

Unless otherwise defined, all terms (including technical and scientific terms) are to be given their ordinary and customary meaning to a person of ordinary skill in the art and are not to be limited to a special or customized meaning unless expressly so defined herein.

This application may include references to certain trademarks. Although the use of trademarks is permissible in patent applications, the proprietary nature of the marks should be respected, and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer-readable media comprising instructions which, when executed by one or more hardware processors, cause performance of operations comprising:
    obtaining a set of characteristics of a target user, the set of characteristics comprising one or more characteristics of the target user;
    determining a set of candidate data metrics that are relevant to the target user based on the set of characteristics of the target user, the set of candidate data metrics comprising one or more data metrics;
    presenting the set of candidate data metrics as a set of recommended data metrics for generating a visualization in a user dashboard;
    receiving user input selecting a particular data metric of the set of recommended data metrics;
    generating the visualization based on a set of values associated with the particular data metric; and
    presenting the visualization in the user dashboard.

2. The one or more non-transitory computer-readable media of claim 1, wherein determining a set of candidate data metrics that are relevant to the target user comprises:
    obtaining sets of training data, wherein a first set of training data of the sets of training data comprises:
      one or more characteristics of a particular user; and
      one or more data metrics that are relevant to the particular user;
    training a machine learning model based on the sets of training data; and
    applying the machine learning model to the set of characteristics of the target user to determine the set of candidate data metrics that are relevant to the target user.

3. The one or more non-transitory computer-readable media of claim 2, wherein the operations further comprise:
    receiving feedback regarding the set of candidate data metrics that are relevant to the target user; and
    updating the machine learning model based on the feedback.

4. The one or more non-transitory computer-readable media of claim 1, wherein the set of characteristics of the target user comprises: target user activity and/or target user interaction with information corresponding to the set of candidate data metrics.

5. The one or more non-transitory computer-readable media of claim 1, wherein obtaining a set of characteristics of the target user comprises: analyzing content presented by or generated by the target user; and wherein determining a set of candidate data metrics that are relevant to the target user is based on the analyzing of the content presented by or generated by the target user.

6. The one or more non-transitory computer-readable media of claim 1, wherein the operations further comprise:
    creating a multi-dimensional representation of a data set;
    utilizing the multi-dimensional representation of the data set to query an application programming interface for the set of values; and
    receiving, from the application programming interface, the set of values.

7. The one or more non-transitory computer-readable media of claim 1, wherein the operations further comprise:
    selecting a visualization type for the visualization based on the set of characteristics of the target user by:
      obtaining sets of training data, wherein a first set of training data of the sets of training data comprises:
        one or more characteristics of a particular user; and
        one or more visualization types relevant to the particular user;
      training a machine learning model based on the sets of training data; and
      applying the machine learning model to the set of characteristics of the target user to select the visualization type.

8. The one or more non-transitory computer-readable media of claim 7, wherein the operations further comprise:
    receiving feedback regarding the visualization type; and
    updating the machine learning model based on the feedback.

9. The one or more non-transitory computer-readable media of claim 1, wherein the operations further comprise:
    selecting a visualization type for the visualization based on the particular data metric by:
      obtaining sets of training data, wherein a first set of training data of the sets of training data comprises:
        one or more data metrics; and
        one or more visualization types relevant to the one or more data metrics;
      training a machine learning model based on the sets of training data; and
      applying the machine learning model to the particular data metric to select the visualization type.

10. The one or more non-transitory computer-readable media of claim 9, wherein the operations further comprise:
    receiving feedback regarding the visualization type; and
    updating the machine learning model based on the feedback.

11. A method comprising:
    obtaining a set of characteristics of a target user, the set of characteristics comprising one or more characteristics of the target user;
    determining a set of candidate data metrics that are relevant to the target user based on the set of characteristics of the target user, the set of candidate data metrics comprising one or more data metrics;

presenting the set of candidate data metrics as a set of recommended data metrics for generating a visualization in a user dashboard;

receiving user input selecting a particular data metric of the set of recommended data metrics;

generating the visualization based on a set of values associated with the particular data metric; and presenting the visualization in the user dashboard wherein the method is performed by at least one device including a hardware processor.

12. The method of claim 11, wherein determining a set of candidate data metrics relevant to the target user comprises:

obtaining sets of training data, wherein a first set of training data of the sets of training data comprises:
one or more characteristics of a particular user; and
one or more data metrics that are relevant to the particular user;

training a machine learning model based on the sets of training data; and applying the machine learning model to the set of characteristics of the target user to determine the set of candidate data metrics relevant to the target user.

13. The method of claim 12, further comprising:

receiving feedback regarding the set of candidate data metrics that are relevant to the target user; and updating the machine learning model based on the feedback.

14. The method of claim 11, wherein the set of characteristics of the target user comprises: target user activity and/or target user interaction with information corresponding to the set of candidate data metrics that are relevant to the target user.

15. The method of claim 11, wherein obtaining a set of characteristics of the target user comprises: analyzing content presented by or generated by the target user; and wherein determining a set of candidate data metrics that are relevant to the target user is based on the analyzing of the content presented by or generated by the target user.

16. The method of claim 11, wherein obtaining a set of characteristics of the target user comprises:

obtaining user input indicating a one or more characteristics of the target user;

using natural language processing to analyze the user input to extract the one or more characteristics of the target user; and wherein determining the set of candidate data metrics that are relevant to the target user is based on the one or more characteristics of the target user.

17. The method of claim 11, further comprising:

creating a multi-dimensional representation of a data set;

utilizing the multi-dimensional representation of the data set to query an application programming interface for the set of values; and receiving, from the application programming interface, the set of values.

18. The method of claim 11, further comprising:

selecting a visualization type for the visualization based on the set of characteristics of the target user by:
obtaining sets of training data, wherein a first set of training data of the sets of training data comprises:
one or more characteristics of a particular user; and
one or more visualization types relevant to the particular user;
training a second machine learning model based on the sets of training data; and
applying the second machine learning model to the set of characteristics of the target user to select the visualization type.

19. The method of claim 11, further comprising:

selecting a visualization type for the visualization based on the particular data metric by:
obtaining sets of training data, wherein a first set of training data of the sets of training data comprises:
one or more data metrics; and
one or more visualization types relevant to the one or more data metrics;
training a second machine learning model based on the sets of training data; and
applying the second machine learning model to the particular data metric to select the visualization type.

* * * * *